United States Patent [19]
Hobbs et al.

[11] Patent Number: 5,419,639
[45] Date of Patent: May 30, 1995

[54] LOW-PROFILE SLIDE STRUCTURE

[75] Inventors: James D. Hobbs, Plainfield; Martin K. Fall, Indianapolis; Carl E. Hansen, Greenfield, all of Ind.

[73] Assignee: General Devices Co., Inc., Indianapolis, Ind.

[21] Appl. No.: 204,752

[22] Filed: Mar. 1, 1994

[51] Int. Cl.⁶ .............................................. F16C 29/04
[52] U.S. Cl. ................................... 384/18; 384/49
[58] Field of Search .................. 384/18, 47, 49, 59, 384/53, 48

[56] References Cited

U.S. PATENT DOCUMENTS 3,712,690  1/1973  Fall .
4,787,756  11/1988  Pilarski ............................ 384/47
4,921,359  5/1990  Sakamoto ........................ 384/18
5,222,814  6/1993  Boelryk .......................... 384/47

*Primary Examiner*—Lenard A. Footland
*Attorney, Agent, or Firm*—Barnes & Thornburg

[57] ABSTRACT

The present invention relates to telescoping slide assemblies having interconnected slide members including a stationary slide member, a chassis slide member, and an intermediate slide member positioned therebetween, and particularly to mechanisms for governing movement of a chassis slide member in a telescoping slide assembly. More particularly, the invention relates to multiple telescoping slide assemblies coupled together in parallel spaced-apart relation by a fixture attached to their respective intermediate slide members.

23 Claims, 5 Drawing Sheets

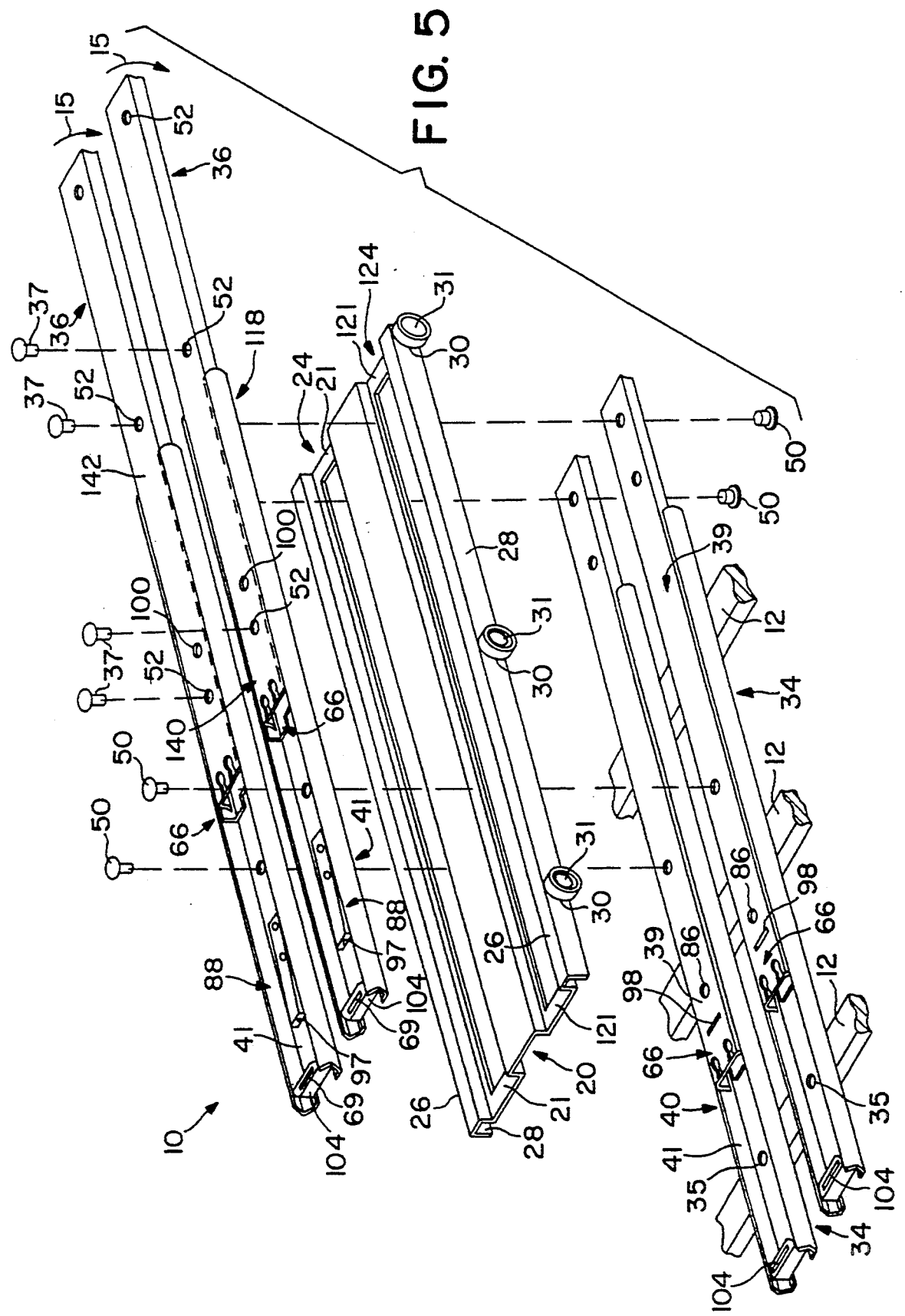

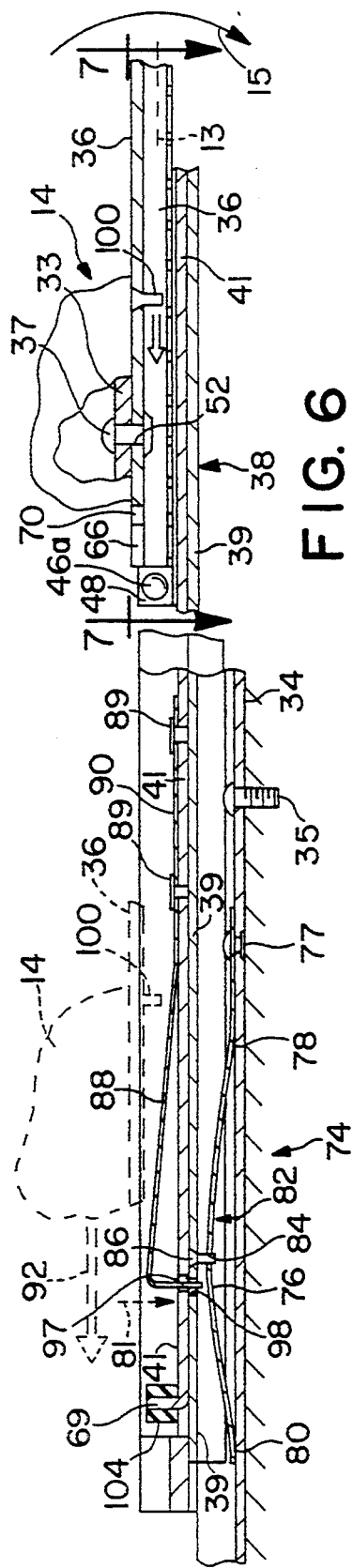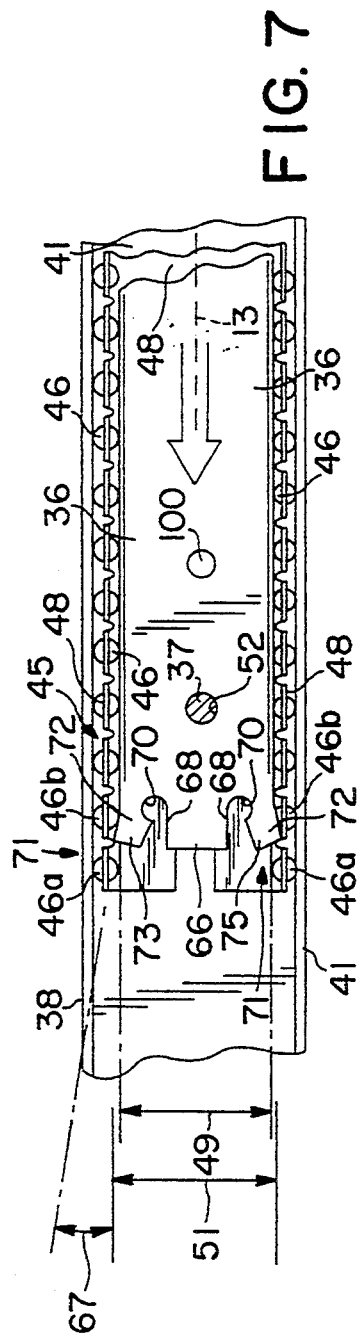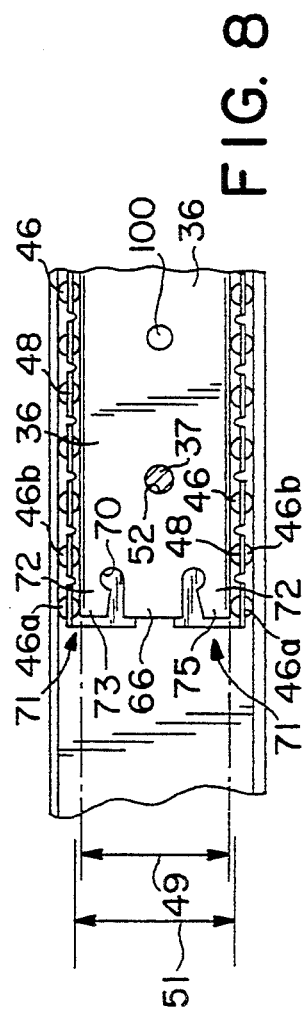

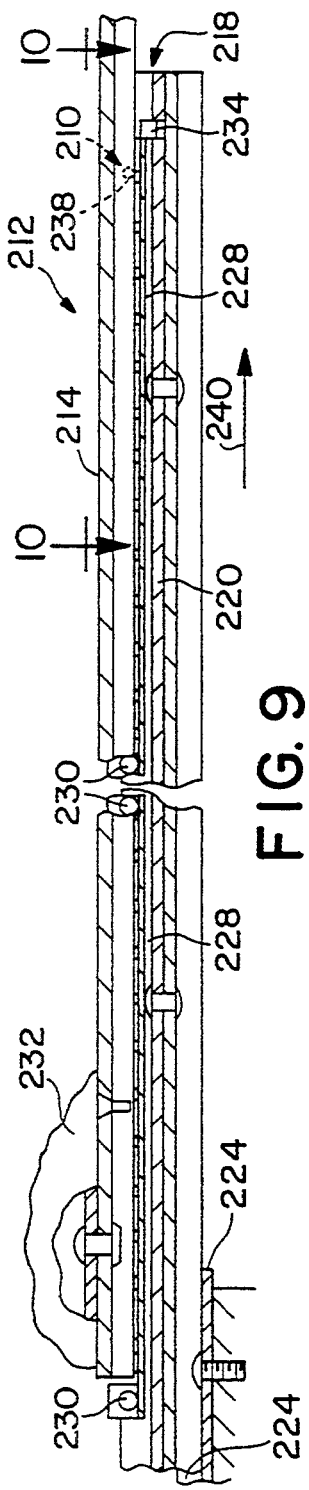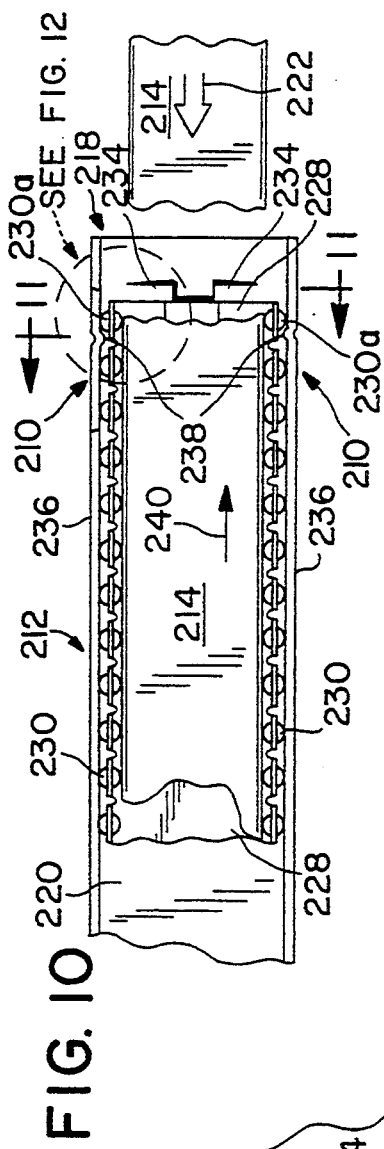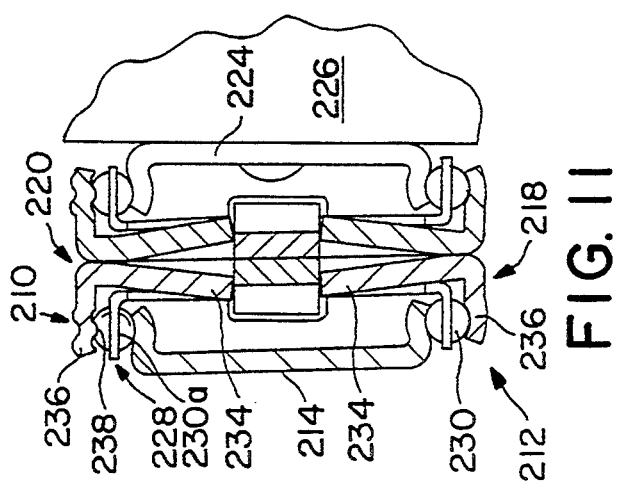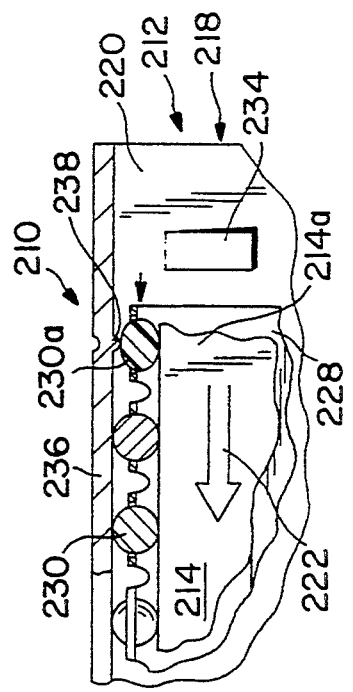

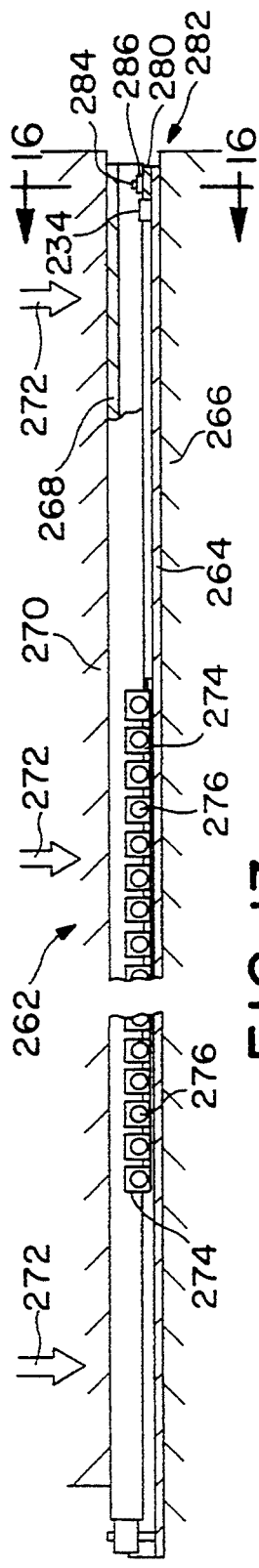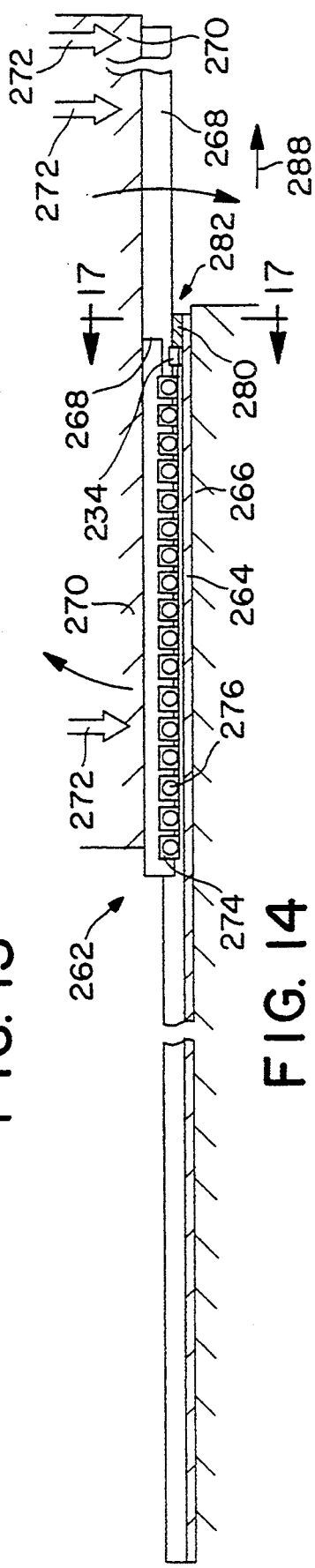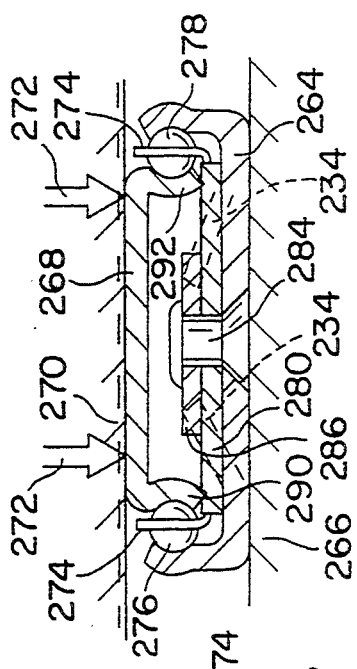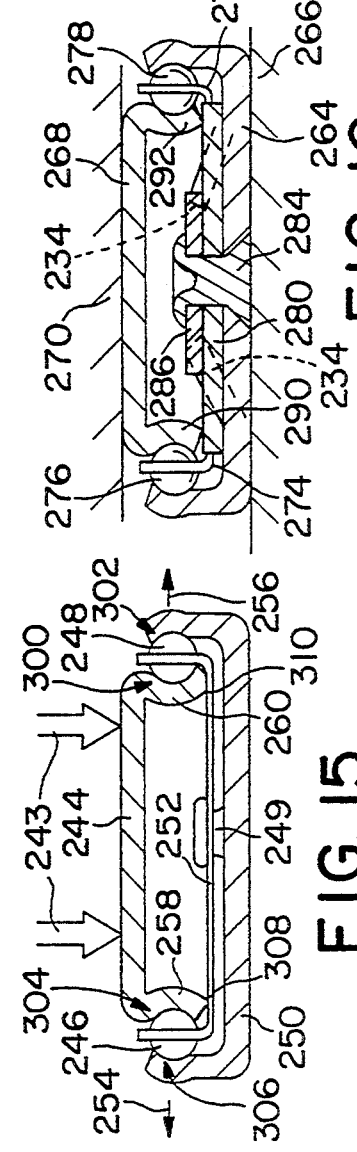

LOW-PROFILE SLIDE STRUCTURE

BACKGROUND AND SUMMARY OF THE INVENTION

The present invention relates to telescoping slide assemblies having interconnected slide members including a stationary slide member, a chassis slide member, and an intermediate slide member positioned therebetween, and particularly to mechanisms for governing movement of a chassis slide member in a telescoping slide assembly. More particularly, the invention relates to multiple telescoping slide assemblies coupled together in parallel spaced-apart relation by a fixture attached to their respective intermediate slide members.

Telescoping slide assemblies are well known. Telescoping slide assemblies have been mounted to drawers or platforms to permit easy movement of equipment between a retracted position and an extended position. See, for example, Maxwell S. Fall U.S. Pat. No. 3,712,690.

In some situations, equipment may be housed in a cabinet during operation of the equipment and withdrawn from the cabinet for equipment maintenance or other purposes. For example, medical laboratories use a blood-shaking apparatus to shake blood contained in vials for various medical tests. The apparatus includes a vibrating machine which is designed to be moved into a cabinet to permit the blood-containing vials to be shaken inside the cabinet arid then to be moved out of the cabinet so that the shaken blood samples can be removed and the vibrating machine can be reloaded with fresh blood samples to be shaken. The blood-containing vials are shaken inside the cabinet in order to minimize contamination of surrounding areas in the event one of the blood-containing vials should break.

In the past, blood-shaking apparatus included a telescoping slide apparatus having a pair of separate slide assemblies. The slide assemblies are positioned in spaced-apart parallel relation and mounted to a cabinet support surface or cross member and arranged to engage the bottom of the vibrating machines. Lacking additional lateral support, that configuration permitted the vibrating machine to rock from side to side inside the cabinet, making a considerable amount of noise and potentially damaging the equipment and breaking blood-containing vials.

An additional problem became evident when the vibrating machines were extended from the cabinet. A lack of structural rigidity between the slide assemblies allowed the slide assemblies to flex differentially, wherein one slide assembly flexes along its longitudinal axis a little more than an adjacent slide assembly. When one slide assembly flexes more than its adjacent slide assembly, the equipment supported by the slide assemblies lacks a stable foundation and tends to lean toward the more flexible slide assembly.

An improved telescoping slide apparatus that is configured to move a blood-vibrating machine or any other shaking machine into and out of a cabinet so that rocking of the machine inside the cabinet is minimized would be a welcomed improvement over a conventional slide apparatus. Desirably, such an improved slide apparatus would include a pair of slide assemblies that are fortified and structurally rigid enough to minimize differential flexing of the slide assemblies that might induce a vibrating machine to lean over as it is being pulled out of its storage cabinet.

A simple mechanism is also needed to hold the chassis slide member in an extended position relative to the intermediate slide member once the telescoping slide assembly is pulled out to its extended position. What is needed is an improved slide assembly able to hold out the chassis slide member in an extended position relative to the intermediate slide member without requiring that extra parts or components be mounted on the slide assembly.

A conventional telescoping slide assembly can be worn out prematurely in certain cases when the chassis slide member comes into contact with certain ball bearings contained in raceways formed in a short ball bearing clip mounted to the surrounding intermediate slide member during extension and retraction of the slide members. This problem occurs more often if the telescoping slide assembly is mounted for movement in a horizontal plane rather than the more typical vertical plane. When conventional slide assemblies are mounted horizontally, the downward force of the load carried on the slide assembly pushes the ball bearings located in the ball bearing clip positioned between the chassis and intermediate slide members against their ball bearing raceways. This causes excessive wearing and/or deformation of the ball bearings. What is needed is a mechanism for preventing ball bearing deformation of the type just described to minimize any "drag" on the chassis slide member that might otherwise occur during extension and retraction of the telescoping slide assembly.

One object of the invention is to provide a stable telescoping slide apparatus having a pair of side-by-side bottom-mounted side assemblies that are connected together by a rigidifying plate without increasing the total vertical height of the telescoping slide apparatus. A low-profile telescoping slide apparatus that would be very rigid and stable yet thin enough to fit into a small space inside a cabinet would avoid problems associated with conventional telescoping slide apparatus.

Other objects of the invention are to provide an inner slide member that can be locked in a partly extended position relative to an outer slide member easily using a releasable frictional connection and that can move smoothly between extended and retracted positions without dislocating ball bearings used to support the inner slide member. A telescoping slide assembly including such features would be welcomed by users of slides.

According to one aspect of the present invention, a telescoping slide apparatus is provided for moving equipment between a retracted position and an extended position. The apparatus includes a plurality of bottom-mounted telescoping slide assemblies having stationary slide members, chassis slide members, and intermediate slide members interconnecting their respective stationary and chassis slide members. Means for connecting the intermediate slide members together in parallel spaced-apart relation is provided. The connecting means is formed to include aperture means for receiving an intermediate slide member therein.

In preferred embodiments, the connecting means includes a plate member having a plurality of longitudinally extending channels. Each channel is formed to include a longitudinally extending aperture or window for receiving an intermediate slide member. Thus the intermediate slide members, and therefore the slide assemblies, are held in parallel spaced-apart relation and positioned for attachment to a cabinet floor or cross member and the bottom of the equipment to be moved by the telescoping slide apparatus.

By mounting the intermediate slide members in the windows formed in the plate member, the plate member and the intermediate slide members extend and retract together as a unit. Each intermediate slide member fits in one of the windows formed in the plate member to "eliminate" the material thickness of the plate member. In other words, a plate member is used to rigidify the side-by-side pair of telescoping slide assemblies without adding any amount to the total vertical height (or thickness) of the slide apparatus. Advantageously, the plate apertures or windows are sized to receive existing slide assemblies. Thus, the connecting means provides lateral support and rigidity to the side-by-side pair of bottom-mounted telescoping slide assemblies without affecting the vertical height of the existing slide assemblies.

The plate member further includes a pair of parallel lateral edges extending along the length of the plate member and a skirt depending from each lateral edge. The longitudinally extending channels and the skirts combine to provide structural rigidity to the telescoping slide assemblies to reduce the differential flexing of the slide assemblies and the tendency of the equipment to lean when the slide assemblies are extended outside of the cabinet.

A plurality of rollers are loosely attached to each skirt to allow rotational and translational movement of the rollers relative to the plate member. The outer diameter of the rollers is substantially equal to a thickness dimension of the telescoping slide assemblies. When the slide assemblies are attached to the equipment and the cabinet surface, the rollers fit tightly between the cabinet surface and the bottom of the equipment, thereby providing lateral support to the equipment while the equipment is positioned inside the cabinet. These floating position rollers stabilize the equipment as it is moved in the cabinet yet float to allow for tolerances in the manufacture of the cabinet frame.

By providing a plate member with longitudinally extending channels having apertures or windows for rigidly receiving the intermediate slide members, and skirts depending from the lateral edges of the plate member, the present invention provides structural rigidity to minimize differential flexing of the telescoping slide assemblies and reduce the tendency for the vibrating machines to lean over to one side when extended from the cabinet. The intermediate slide members fit into apertures or windows formed in the plate member so that the total slide thickness or vertical height of the telescoping slide apparatus is not increased by the addition of the rigidifying plate member to the apparatus. By providing rollers coupled to the skirts, the present invention provides lateral support to minimize transverse oscillations when the equipment is retracted into the cabinet.

There is a certain vertical clearance between the vibrating machine and the floor of a conventional cabinet, with some of the vertical clearance taken up by conventional bottom-mounted telescoping slide assemblies. Thus, any improved telescoping slide apparatus should not have a vertical height greater than the vertical height of the conventional telescoping slide assemblies so that the new telescoping slide apparatus fits into the existing space between the vibrating machine and the cabinet floor and thus remains within the pre-existing vertical height clearance space. A rigidifying plate member in accordance with the present invention can be coupled to conventional telescoping slide assemblies to provide the necessary lateral support and structural rigidity to the conventional telescoping slide assemblies without altering the dimensions of the slide assemblies, thereby providing a stable, low vertical height telescoping slide assembly welcomed by owners of cabinets containing slide-in and slide-out vibrating equipment.

In other preferred embodiments, each slide member includes a pair of lateral edges formed to define bearing surfaces. The slide members are positioned so that the bearing surfaces of the chassis and stationary slide members cooperate with the bearing surfaces of the intermediate slide member to form bearing races. A plurality of ball bearings are positioned to move in the bearing races thus formed.

According to another aspect of the present invention, a releasable lock-out mechanism provides means for holding the chassis slide members in the extended position relative to the plate member. Advantageously, no extra components are added to the slide assembly to define this releasable lock-out mechanism. This releasable lock-out mechanism could be used in a wide variety of different slide assemblies. In one embodiment, each chassis slide member has an inner end that is deformed to provide flared tip ends that are extended laterally outwardly to contact and engage one of the ball bearings positioned in the bearing race formed between the chassis and intermediate slide member to create a releasable friction lock-out mechanism. In another embodiment, each intermediate slide member includes a stop member for blocking movement of the bearing race past a certain point during extension of the slide members and a detent for engaging between ball bearings positioned in the bearing race to create a releasable friction lock-out mechanism operable to hold the chassis slide member temporarily in an extended position relative to the intermediate slide member.

According to yet another aspect of the present invention, a skid pad is mounted to the intermediate slide member and positioned to lie under the inner chassis slide member when the telescoping slide assembly is mounted for movement in a horizontal plane. This skid pad replaces the conventional ball bearing clip often mounted at the outermost end of an intermediate slide member. Any downward load applied to the horizontal chassis slide member will now be transferred to the skid pad instead of to ball bearings in a conventional ball bearing clip engaging the chassis and intermediate slide members. This will help minimize any ball bearing deformation problem that might otherwise exist and should minimize drag forces applied by heavy loads to the chassis slide member during extension and retraction. This skid pad could be used in a wide variety of different slide assemblies.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 5 is an exploded perspective view of the telescoping slide apparatus according to the present invention showing a pair of stationary slide members mounted on the underlying cabinet support surfaces, a single plate member arranged to mount onto the underlying stationary slide members and formed to include spaced-apart longitudinally extending channels, a pair of intermediate slide members sized to fit into the longitudinally extending channels in the plate member, and overlying chassis slide members which mount onto the intermediate slide members and carry the equipment into and out of the cabinet shown in FIG. 1;

FIG. 6 is a broken longitudinal sectional view of a telescoping slide assembly in accordance with the present invention showing a chassis slide member in a locked-out, fully extended position, and further showing (in phantom) movement of the chassis slide member to the left to approach its retracted position (relative to the intermediate slide member) just before it releases a lock-out mechanism that holds the intermediate slide member in a fully extended position relative to the stationary slide member;

FIG. 7 is a partial plan view of the telescoping slide assembly taken along lines 7—7 of FIG. 6 showing flared tips of a left end of the chassis slide member in an expanded position engaging a detent provided between ball bearings positioned between the chassis slide member and the intermediate slide member to lock the chassis slide member in a fully extended position relative to the intermediate slide member;

FIG. 8 is a view similar to FIG. 7 showing the flared tips of the chassis slide member in a compressed state disengaging the detent and allowing movement of the chassis slide member relative to the intermediate slide member toward a retracted position;

FIG. 9 is a view similar to the right side of the telescoping slide assembly in FIG. 6 showing a chassis slide member in a locked-out, fully extended position relative to the underlying intermediate slide member;

FIG. 10 is a top plan view taken along line 10—10 of FIG. 9, with portions broken away, showing a bearing retainer engaging a pair of lanced stop members formed in the intermediate slide member and a dimple formed in each side of the intermediate slide member and arranged to lie between two side-by-side ball bearings at the right side of the bearing retainer to provide a detent for resisting movement of the chassis slide member to the left relative to the intermediate slide member;

FIG. 11 is an enlarged elevational view taken along line 11—11 of FIG. 10 showing the inclined positions of the two lanced stop members formed in the intermediate slide member relative to the right end of the bearing retainer;

FIG. 12 is an enlarged view of a circular section 12 in FIG. 10 showing deflection of one ball bearing as it moves past an adjacent "lock-out" dimple to release the friction lock-out established by the dimple as shown in FIG. 10 during retracting movement of the chassis slide member to the left under a load sufficient to "squeeze" the ball bearing and push it through the space provided between the "fixed" dimple and the "moving" chassis slide member;

FIG. 13 is a longitudinal sectional view of a fully retracted telescoping slide assembly showing a load mounted on a chassis slide member and positioned to lie above a set of ball bearings in a slidable retainer;

FIG. 14 is a view similar to FIG. 13 showing the telescoping slide assembly in a partly extended position and showing a pair of curved arrows that diagrammatically represent a torque or moment that is applied to the telescoping slide assembly by the overhanging load and causes the chassis slide member to tip or pivot about a central horizontal axis defined by the two curved arrows;

FIG. 15 is a transverse sectional view of a prior art slide assembly portion Showing how a downward load applied to a chassis slide member could deform ball bearings held in a conventional short ball bearing clip between the chassis slide member and an underlying intermediate slide member by urging one row of ball bearings to the left and the other row of ball bearings to the right;

FIG. 16 is a transverse sectional view taken along line 16—16 of FIG. 13 showing a skid pad in accordance with the present invention mounted to the intermediate slide member and positioned to underlie the chassis slide member; and FIG. 17 is a transverse sectional view taken along line 17—17 of FIG. 14 showing downward movement of the chassis slide member onto the underlying skid pad as a result of tipping or pivoting movement of the partly extended chassis slide member to prevent unwanted dislocation of the ball bearings along the lines illustrated in FIG. 15.

DETAILED DESCRIPTION OF THE DRAWINGS

Figure 1:
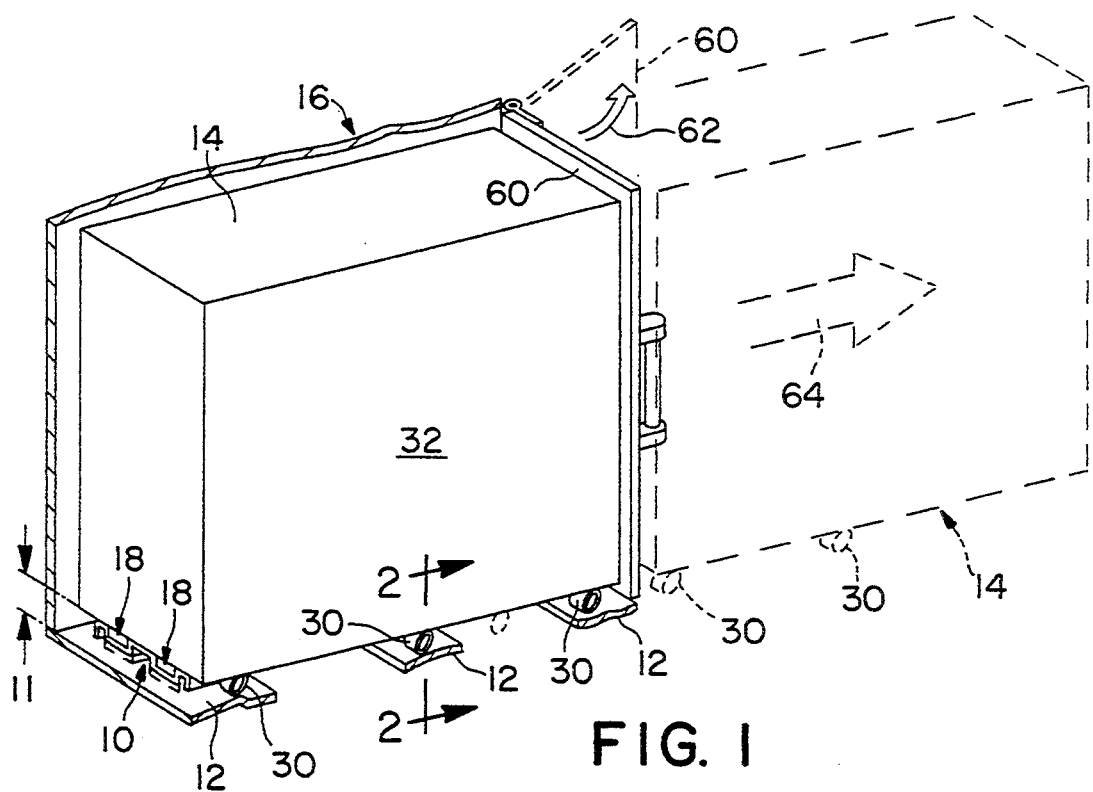
FIG. 1 is a perspective view of a cabinet, with portions broken away, showing slide apparatus according to the present invention positioned between cabinet cross members and an overlying piece of equipment and arranged to move the equipment between a retracted position inside the cabinet (shown in solid lines) and an extended position outside the cabinet (shown in dotted lines)

A telescoping slide apparatus 10 according to one aspect of the present invention is shown in FIG. 1 operably supported inside a cabinet 16 by a cabinet support surface or cross members 12. The slide apparatus 10 is positioned between the cabinet support surface or cross member 12 and a piece of equipment 14 to support the equipment 14 for movement between a retracted position inside a cabinet 16 (solid lines) and an extended position outside the cabinet 16 (dotted lines).

The slide apparatus 10 has a desirably low profile and is sized to fit in the vertical clearance space 11 between the cabinet support surface on cross members 12 and the bottom of the piece of equipment 14. Slide apparatus 10 includes an extra rigidifying plate member 20 which is configured to enhance the stability of slide apparatus 10 without increasing the vertical height of slide apparatus 10. Although the piece of equipment is a vibrating or shaking machine in one embodiment, it will be understood that it is within the scope of the invention to use the innovative telescoping slide apparatus 10 to move any piece of equipment into and out of cabinet 16.

Figure 2:
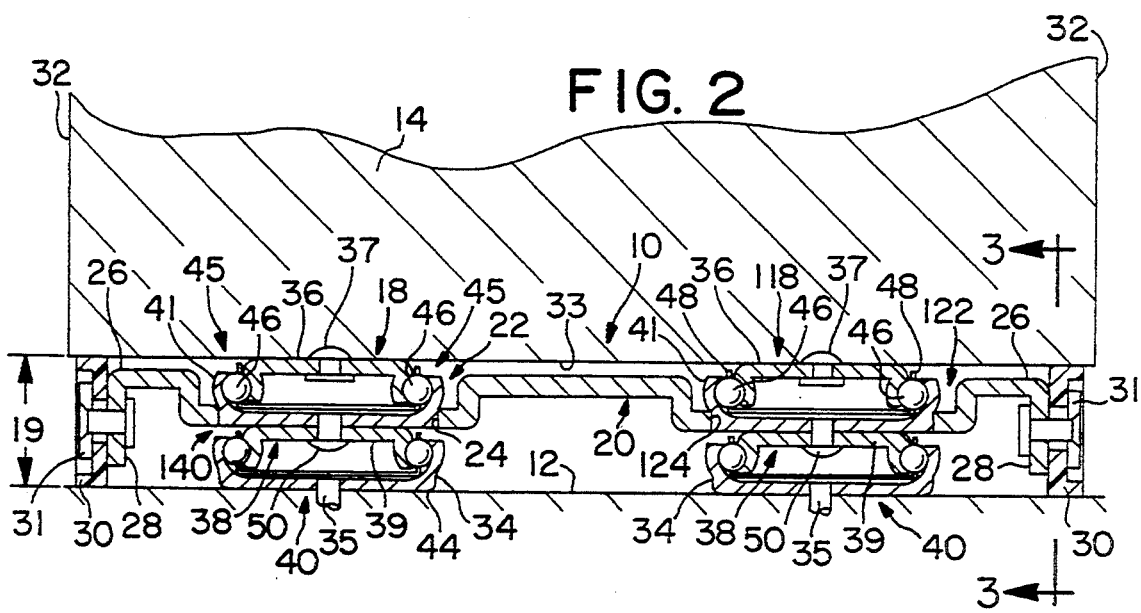
FIG. 2 is a sectional view taken along line 2—2 of FIG. 1 of a telescoping slide apparatus according to the present invention showing a pair of bottom-mounted telescoping slide assemblies positioned between the cabinet and the equipment, a plate member having channels with apertures formed therein for receiving the slide assemblies, and rollers coupled to skirts depending from lateral edges of the plate member to provide lateral support to the equipment.

Referring to FIGS. 2 and 5, the slide apparatus 10 includes a pair of telescoping slide assemblies 18, 118 held in parallel spaced-apart relation by a plate member 20. The plate member 20 is formed to define a pair of longitudinally extending channels 22, 122, each channel 22, 122 having an aperture 24, 124, respectively, for receiving the slide assemblies 18, 118. The channels 22, 122 include transverse brace portions 21, 121 (shown in FIG. 5) which define the ends of apertures 24, 124 and provide support for the slide assemblies 18, 118. The slide assemblies 18, 118 are positioned in the apertures 24, 124, respectively, and rigidly attached to the plate member 20 such as by welding or other suitable attachment means.

While the longitudinally extending channels 22, 122 could be eliminated without exceeding the scope of the invention, the channels 22, 122 serve an important strengthening function. For example, one problem associated with the use of multiple slide assemblies 18, 118 to support a piece of equipment 14 is differential flexing of the slide assemblies 18, 118 when the slide assemblies 18, 118 are fully extended. Due to slight variations between slide assemblies 18, 118, one slide member 18 might flex along its longitudinal axis 13 in direction 15 (FIGS. 5-6) a little more than an adjacent slide assembly 118. Rigidly attaching the slide assemblies 18, 118 to the plate member 20 takes advantage of the strengthening function of the channels 22, 122 to reduce any differential flexing of the slide assemblies 18, 118 along their respective longitudinal axes when the equipment 14 is moved to an extended position outside of the cabinet 16.

The plate member 20 also includes longitudinally extending lateral edges 26. A skirt 28 depends downwardly from each lateral edge 26 and serves two functions. First, the skirt 28 adds strength to the apparatus 10 to augment the strengthening function of the channels 22, 122. Second, it provides attachment points for a plurality of rollers 30 shown in FIGS. 1-5.

The rollers 30 are loosely coupled to each skirt 28 by rivets 31 or other suitable coupling means. The loose coupling of the rollers 30 permits rotational and translational movement of the rollers 30 in a plane parallel to the skirt 28 but does not allow for movement of the rollers 30 along the longitudinal axis of the rivets 31. Loose coupling between the rollers 30 and the skirts 28 is advantageous in some applications, such as transporting shaking equipment into and out of a cabinet wherein the cabinet 16 is built up of various channels and cross members welded together to provide internal structure. Typically, the cross members 12, upon which the equipment 14 is supported, are not exactly plumb or in exact alignment. Thus, variability exists in the surfaces that the rollers 30 must roll across, and it is advantageous to allow the rollers 30 to move translationally relative to rivet 31 as well as rotationally during movement of the equipment 14 into and out of the cabinet 16 to "self-adjust" for changes in tolerances within the cabinet 16. Thus, when the equipment 14 as is fully retracted into the cabinet 16, the rollers 30 can wedge between the cross members 12 and the equipment 14 as shown, for example, in FIGS. 2 and 3 to provide lateral stability without regard to irregularities in the remaining structure of the cabinet 16.

One illustrative application for the slide apparatus 10 is shown in FIG. 1, wherein the slide apparatus 10 includes three rollers 30 attached to each skirt 28. Of course, the number and placement of the rollers 30 is not limited to the illustrated embodiment, but is dictated by a particular application.

Figure 3:
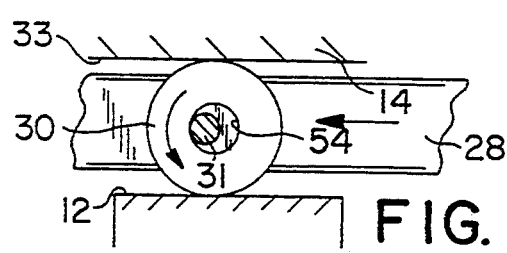
FIG. 3 is a partial sectional view of the telescoping slide apparatus taken along lines 3—3 in FIG. 2 showing a roller coupled to a skirt and positioned between a cabinet cross member and the bottom of the equipment to provide lateral support to the equipment.

The present invention enhances the lateral stability of the equipment 14 by positioning the skirts 28 near the lateral sides 32 of the equipment 14 and sizing the rollers 30 to have an outer diameter equal to the vertical height 19 of the slide assemblies 18, 118. As shown in FIGS. 2 and 3, the rollers 30 wedge between the cabinet support surface or cross member 12 and the equipment 14 when the equipment 14 is retracted into the cabinet, thereby enhancing the lateral stability of the equipment 14 and reducing transverse oscillations of the equipment 14. The plate member 20 preferably has a lateral dimension that locates each skirt 28 so that the rollers 30 can be positioned at or near the sides 32 of the equipment 14 as shown in FIG. 2 in order to provide maximum lateral support to the equipment 14 as it is moved into and out of the cabinet.

Each telescoping slide assembly 18, 118 includes a stationary slide member 34 rigidly attached to the cabinet support surface or cross member 12 by a screw 35 or other suitable attachment means as shown in FIG. 2 and a chassis slide member 36 rigidly attached to the bottom wall 33 of the equipment 14 by rivet 37 or other suitable attachment means as shown in FIGS. 2 and 6. An intermediate slide member 38 fits into each of the elongated apertures 24, 124 formed in the plate member 20 and slidably interconnects the stationary and chassis slide members 34, 36 for movement along a longitudinal axis between a retracted position and an extended position. Each intermediate slide member 38 includes a top section 37 and a bottom section 39 as shown in FIGS. 2 and 5. Rivets 50 or other suitable attachment means are used to hold the top and bottom sections 41 and 39 of each intermediate slide member 38 together as shown in FIGS. 2 and 5. Each top section 41 is illustratively welded to the plate member 20 to attach each intermediate slide member 38 to the plate member 20.

Slide assemblies 18, 118 are constructed by fastening subassemblies 40, 140 together in top-to-bottom fashion as shown best in FIG. 5. Subassembly 40 includes stationary slide member 34 and the bottom section 37 of intermediate slide member 38. Subassembly 140 includes the top section 41 of intermediate slide member 38 and the chassis slide member 36. A plurality of ball bearings 46 are retained in bearing races 45 provided in these slide members by a bearing retainer 48 as shown in FIGS. 2 and 7. Suitable subassemblies 40, 140 are disclosed, for example, in Fall U.S. Pat. No. 4,089,568, issued on May 16, 1978.

Figure 4:
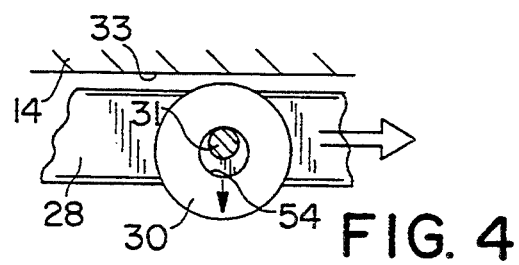
FIG. 4 is a partial view similar to FIG. 3 showing the equipment in an extended position with the roller moved out of contact with the cabinet cross member and the bottom of the equipment, thereby removing the lateral support provided by the roller when the equipment is in the retracted position inside the cabinet.

The loose coupling between the rollers 30 and the skirts 28 is shown more clearly in FIGS. 3 and 4. Each roller 30 includes a central axle-receiving aperture 54 having a larger diameter than the rivets 31 used to couple the rollers 30 to the skirts 28. Thus, the rollers 30 are capable of rotational and translational movement in a plane parallel to the skirt 28. Referring to FIG. 3, when the roller 30 is located at a cross member 12, the roller 30 fits tightly between the cross member 12 and the bottom wall 33 of equipment 14 to provide lateral stability. As the equipment 14 is extended in direction 64 from the retracted position shown in FIGS. 1 and 3 to the extended position shown in FIG. 4 and in dotted lines in FIG. 1, the roller 30 drops off the cross member 12 and provides no lateral support to the equipment 14.

Referring to FIG. 5, in constructing the slide assemblies 18, 118, the top and bottom sections 41, 39 of the intermediate slide members 38 are rigidly held together. Illustratively, rivets 50 are used to attach the sections 39, 41 together, but any other suitable attachment means can be used. The attached sections 39, 41 cooperate to form the intermediate slide member 38 of the completed telescoping slide assembly 18, 118.

As shown in FIG. 2, the top section 41 is aligned with one of the apertures 24, 124 formed in the plate member 20. When the top sections 41 are positioned in the apertures 24, 124, they can be welded, or otherwise rigidly attached, in place. Thus, when the top and bottom sections 41, 39 are fastened together to create the intermediate side assemblies 38, the resulting telescoping slide assemblies 18, 118 are rigidly attached to the plate member 20.

Advantageously, using apertures 24, 124 sized to receive the telescoping slide assemblies 18, 118 permits the slide assemblies 18, 118 to be rigidly attached to the plate member 20 without increasing the vertical height 19 of the slide assembly 18, 118. As shown in FIG. 2, the vertical height of the telescoping slide apparatus 10 must fit within the existing vertical clearance space 19 between the cabinet support surface 12 and the bottom wall 33 of the equipment 14. The plate member 20 advantageously increases the rigidity and stability of the telescoping slide apparatus 10 without increasing the total vertical height of the apparatus 10. Thus, a slide apparatus 10 according to the present invention can be cost-effectively installed in an existing cabinet having a predetermined vertical clearance space 19.

The chassis slide members 36 can be provided with apertures 52 for receiving rivets 37 or the like for attaching the telescoping slide assemblies 18, 118 to the equipment 14. Likewise, the stationary slide members 34 can be provided with apertures 53 for receiving rivets 35 or the like for attaching the telescoping slide assemblies 18, 118 to the cabinet support surface or cross members 12.

In practice, when the equipment 14 is fully retracted into the cabinet 16, as shown in FIGS. 1 and 3, the rollers 30 are positioned to be wedged between the cross members 12 and the equipment 14 to provide lateral stability. As the equipment 14 extends out of the cabinet 16, the rollers 30 move out of the wedged position and no longer provide lateral stability to the equipment 14. The door 60 of the cabinet 16 is closed when the equipment is fully retracted inside the cabinet 16 as shown in solid lines in FIG. 1. In this configuration, the equipment 14 can be safely operated to shake blood or any other stored material in equipment 14 because the rollers 30 are wedged between the cross members 12 and the equipment 14 to provide lateral stability to the equipment 14 to minimize transverse oscillations.

When the blood or other stored material has been shaken, the door 60 is opened in the direction of arrow 62, as shown open in dotted lines 1 in FIG. 1, and the equipment 14 is extended out of the cabinet 16 in the direction of arrow 64. In the extended position shown in dotted lines in FIG. 1, the plate member 20 minimizes differential flexing of the telescoping slide assemblies 18, 118 to reduce greatly the tendency of the equipment 14 to lean in one direction. Advantageously, this allows easier loading and unloading of blood or other stored material into and out of the cabinet.

According to another aspect of the present invention, the telescoping slide apparatus 10 also includes two releasable lock-out mechanisms as shown in FIGS. 6-8. A first lock-out mechanism 74 is shown in FIG. 6 and a second lock-out mechanism 71 is shown in FIGS. 7 and 8. The first lock-out mechanism 74 is a positive-engagement coupling that operates to lock the intermediate slide member 38 in a fixed position relative to the stationary slide member. The second lock-out mechanism 71 is a frictional hold-out coupling that operates to lock the chassis slide member 34 in a fixed position relative to the intermediate slide member 38.

Referring to FIG. 6, the apparatus 10 includes a first lock-out mechanism 74 for retaining the intermediate slide member 38 in the fully extended position relative to the stationary slide member 34. The first lock-out mechanism 74 includes a first flexible strap 76 having a first end 78 riveted or otherwise rigidly affixed to the stationary slide member 34 and disposed parallel to the longitudinal axis of the slide assembly 18, 118. The first strap 76 is curved into a downwardly facing concave configuration as shown in FIG. 6. Affixing the first end 78 to stationary slide member 34 by means of rivet 77 biases the second end 80 into slidable contact with the stationary slide member 34, producing an upwardly extending bowed portion 82 located between the first and second ends 78, 80. An aperture 84 is formed in the longitudinal and transverse center of the bowed portion 82 as shown in FIG. 6.

A pin 86 is attached to the bottom section 39 of the intermediate slide member 38 and extends downwardly therefrom toward the stationary slide member 34. The pin 86 is longitudinally aligned with the aperture 84 in the bowed portion 82 of flexible strap 76 and positioned to enter the aperture 84 when the intermediate slide member 38 is fully extended relative to the stationary slide member 34 as shown in FIG. 6. As the intermediate slide member 38 approaches the fully extended position, the pin 86 moves along the bowed portion 82. The resiliency of the curved strap 76, combined with the slidable contact between the second end 82 and the stationary slide member 34, allows the bowed portion 82 to move downwardly in direction 81 toward the stationary slide member 34 in response to longitudinal movement of the pin 86 along the bowed portion 82. At the fully extended position of the intermediate slide member 34, the pin 86 enters the aperture 84 and the bowed portion 82 springs upwardly, trapping the pin 86 in the aperture 84 and locking the intermediate slide member 38 to the stationary slide member 34.

The lock-out mechanism 74 also includes a second flexible strap 88. The second strap 88 includes a first end 90 rigidly attached to the top surface of the intermediate slide member 38 by means of rivets 89 and extends longitudinally from the first end 90 in the retracting direction 92 as shown in FIG. 6. A second end 94 of the second strap 88 is bent vertically downwardly in direction of arrow 81 to pass through an aperture 97 formed in top section 41 and an aperture 98 formed in the bottom section 39 of the intermediate slide member 38. The second strap 88 extends upwardly from the first end 90 toward the path of the chassis slide member 34 to a second end 94.

An engaging pin 100, similar to pin 86, is attached to the chassis slide member 36 and extends downwardly therefrom to engage the second strap 88. As the chassis slide member 36 moves in direction 92 and approaches the fully retracted position relative to the intermediate slide member 38, the pin 100 moves along the second strap 88, pushing the second end 94 of the second strap 88 downwardly in direction 81. The second end 94 contacts and depresses the bowed portion 82 of the first strap 76. As the bowed portion 82 moves downwardly in response to contact by the second strap 88, the aperture 84 is moved past the pin 86, thereby releasing the lock-out and permitting the intermediate slide member 38 to retract relative to the stationary slide member 34.

As the chassis slide member 36 reaches the fully retracted position relative to the intermediate slide member 38, the inner end 66 of the chassis slide member 36 contacts a tab 69 formed in the intermediate slide member 34. The tab 69 is bent upwardly from the bottom wall 93 of the second track member 144. A rubber grommet 104 is positioned on the tab 69 to cushion and silence the impact of the chassis slide member 36 with the tab 69.

FIGS. 7 and 8 show views of the top of the chassis slide member 36 from a vantage point defined in FIG. 6. The second lock-out mechanism 71 for holding the chassis slide member 34 temporarily in a fixed extended position relative to the intermediate slide member 34 is shown in FIGS. 7 and 8. As seen in FIGS. 7 and 8, the inner end 66 (facing the interior of the cabinet 16) of the chassis slide member 36 includes a pair of longitudinal slots 68. The slots 68 terminate at a stop hole 70 which reduces the propagation of stress cracks from the slots 68. The slots 68 are spread apart to a predetermined angle 67, as may be accomplished using a screw driver inserted into the slots 68 and moved laterally outwardly.

The laterally outward movement of the slot 68 provides a flared tip 72, having tip ends 73, 75, on the inner end 66 for engaging the ball bearings 46 held in position by the retainer 48. When held by the retainer 48, the ball bearings 46 are laterally separated by a distance 49 (FIG. 7). The flared tip 72 is moved laterally outwardly sufficiently to separate the tip ends 73, 75 laterally by a distance 51 (FIG. 7) which is slightly greater than distance 49. Thus, the flared tip ends 73, 75 extend into a plane defined by the ball bearings 46 held in the retainer 48. As the chassis slide member 36 approaches the fully extended position relative to the intermediate slide member 38, the tip ends 73, 75 encounter a first ball bearing 46a in bearing retainer 48. The flared tip 72 flexes laterally inwardly slightly (as shown in FIG. 8) to allow the tip ends 73, 75 to pass by the first ball bearing 46a, and returns to the unflexed condition (as shown in FIG. 7) to come to rest between the first and second ball bearings 46a and 46b in the retainer 48.

When the chassis slide member 36 is retracted relative to the intermediate slide member 34, the flared tip 72 again flexes slightly inwardly to allow the tip ends 73, 75 to pass by the first ball bearing 46a again passing through the configuration shown in FIG. 8. Although simple in design, the flared tip 72 provides an effective and economical releasable frictional lock-out mechanism 71 to retain the chassis slide member 34 in the fully extended position relative to the intermediate slide member 38 without adding any extra components to the slide apparatus 10. Durability of the second lock-out mechanism 71 was demonstrated when a prototype model of the second lock-out mechanism 71 held up through 27,000 cycles, at which time the testing was terminated without any apparent reduction in effectiveness of the second lock-out mechanism 71. Advantageously, frictional lock-out mechanism 71 could be used in a wide variety of slide assemblies.

A second embodiment of a frictional lock-out mechanism is illustrated in FIGS. 9-12. This frictional lock-out mechanism 210 may be used in a telescoping slide assembly 212 in lieu of frictional lock-out mechanism 71 shown in FIGS. 7 and 8. Although lock-out mechanism 210 also operates to hold a chassis slide member 214 temporarily in a partly extended position using friction as shown in FIG. 11, it is located near the outermost end 218 (right side in FIG. 9) of intermediate slide member 220 instead of the position occupied by frictional lock-out mechanism 71 midway along the length of intermediate slide member 38 as shown in FIGS. 6 and 7. Nevertheless, the alternative frictional lock-out mechanism 210 functions advantageously to hold the chassis slide member 214 in a partly extended position without adding any extra components to the slide assembly 212 until a user decides to apply enough force to the chassis slide member 214 in direction 222 shown in FIG. 10 to release the frictional hold-out mechanism 210 as shown in FIG. 12 to allow the chassis slide member 214 to move toward a retracted position.

Referring to FIG. 9, telescoping slide assembly 212 also includes a stationary slide member 224 mounted to a base 226 and a bearing retainer 228 lying between the intermediate and chassis slide members 220, 214 and holding a plurality of ball bearings 230. Illustratively, some of ball bearings 230 are made of steel and others are made of a plastics material such as NYLON ® or DELRIN ®. Preferably, both steel and plastic ball bearings are placed in an innovative predetermined sequence in the slide members 214, 220 to minimize noise generated during extension and retraction of the slide members 214, 220. It has been observed that steel ball bearings produce peened hemispherical depressions in adjacent softer metal ball bearing raceways when exposed to excessive vibration or shock. Movement of steel ball bearings against such peened hemispherical depressions during extension or retraction of a peened telescoping slide assembly can produce unwanted noise and friction or drag. It has been found that plastic ball bearings do not produce such peened hemispherical depressions. Preferably, the steel and plastic ball bearings are arranged in a predetermined sequence and spacing to prevent a steel ball from rolling over a peened hemispherical depression produced by another steel ball, thereby minimizing noise, friction, and drag associated with extension and retraction of such peened slide members. This arrangement is described in James D. Hobbs' U.S. patent application Ser. No. 03/204,622 entitled "Ball Bearing Retainer for Telescoping Slide Assembly," filed herewith on Mar. 1, 1994, which application is incorporated by reference herein. A load 232 is illustratively mounted to the top of chassis slide member 214. Other features of telescoping slide assembly 212 are similar to telescoping slide assembly 10 shown, for example, in FIGS. 2, 5, and 6.

As shown in FIG. 10, chassis slide member 214 is "trapped" in a partly extended position relative to intermediate slide member 220 because one of the ball bearings 230a is positioned between frictional lock-out mechanism 210 and a lanced stop member 234. As shown in FIGS. 10-12, each side wall 236 of intermediate slide member 220 is formed to include an inwardly protruding dimple 238 which functions as one part of frictional lock-out mechanism 210 (the other part is an opposing portion 214a of chassis slide member 214 as shown in FIG. 12).

Stop members 234 are formed in intermediate slide member 220 and arranged to stop movement of ball bearing retainer 228 in direction 240 during extension of the chassis slide member 214. Plastic ball bearings 230a at the front end of the ball bearing retainer 228 are forced to collapse enough to get past small dimples 238 and travel forward in direction 240 with ball bearing retainer 228 until the ball bearing retainer 228 is stopped by stop members 234. When the inner chassis slide member 214 is moved rearwardly in direction 222, resistance of the ball bearing 230a traveling back over dimple 238 in short distance of travel creates a friction holdout. If enough force is applied to chassis slide member 214 in direction 222, then each ball bearing 230a will be collapsed or deformed temporarily as shown, for example, in FIG. 12 to allow a user to return the telescoping slide assembly 212 to a fully retracted position.

A design for minimizing deformation of ball bearings in a slide assembly is shown in FIGS. 13, 14, 16, and 17. Illustratively, this design could be used in the embodiments of FIGS. 1–12 or in many other types of slide assemblies.

A prior art slide assembly 242 is shown in FIG. 15 to illustrate a bearing deformation problem that can impair the performance of a conventional slide assembly. A downwardly directed load 243 applied to inner member 244 can cause the ball bearings 246, 248 to be deformed causing an unwanted drag force to be applied to the inner member 244 during extension of the inner member 244 relative to the adjacent outer member 250.

A conventional ball bearing clip 252 is positioned to lie at the outermost end of outer slide member 250 and between the inner and outer members 244, 250 and configured to hold a first row comprising two side-by-side ball bearings 246 and a second row comprising ball bearings 248. The ball bearing clip 252 is fixed in place using a lance, rivet, spot weld, or other means 249 and functions to stop outward movement of a trailing ball bearing retainer (not shown in FIG. 15) during extension of inner slide member 244 relative to outer slide member 250. An example of a conventional ball bearing clip 44 containing four ball bearings is found in FIG. 2 of James D. Hobbs U.S. Pat. No. 4,998,828.

In use, the downward force 243 applied to inner member 244 pushes ball bearings 246 to the left in direction 254 and ball bearings 248 to the right in direction 256. This downward force acts to move ball bearings 246, 248 against the raceways formed in the slide members adjacent to the fixed ball bearing clip 252. This creates a "wedging" action which attempts to deform ball bearing 248 between points 300 and 302 and to deform ball bearing 246 between points 304 and 306. These ball bearings 246, 248 are typically made of a plastics material such as nylon. This causes excessive wearing and deformation of the ball bearings 246, 248 and movement of lower portions 258 and 260 against ball bearings 246, 248 and against the underlying stainless steel retainer 252. In some cases, deformed ball bearings 246, 248 are unable to "hold up" the inner member properly during later extension and retraction of the slide assembly. Further complicating this matter is that the inner member 244 is moving during slide extension and retraction and creating "flat spots" on lower portions 250, 260. This shaving action over time destroys lower portions 258, 260 on inner member 244 at points 308 and 310.

According to yet another aspect of the present invention, a mechanism is shown in FIGS. 13, 14, 16, and 17 for preventing ball bearing dislocation of the type described in connection with FIG. 15 to minimize any "drag" that might otherwise occur during extension and retraction of the inner member. As shown in FIG. 13, a slide assembly 262 includes a stationary slide member 264 mounted on a base 266 and a chassis slide member 268 sliding in stationary slide member 264 and carrying a load 270. Load 270 exerts a downwardly direction force 272 onto chassis slide member 268. A movable ball bearing retainer 274 carries two rows 276, 278 of ball bearings which help the loaded chassis slide member 268 slide relative to the stationary slide member 264.

Slide assembly 262 does not include a conventional four ball bearing ball clip of the type shown in FIG. 15 or U.S. Pat. No. 4,998,828 at its outermost end 252. A fixed skid pad 280 is mounted at the outermost end 282 of the stationary slide member 264 as shown in FIG. 13 by means of a flat-head rivet 284 and washer 286. As shown in FIG. 14, one function of skid pad 280 is to stop forward movement of ball bearing retainer 274 at a predetermined point during extension of the chassis slide member 268 in direction 288. The skid pad 280 is a thin piece of plastics material such as Ultra High Molecular Weight (UHMW) polyethylene which contacts with lower portions 290, 292 of the chassis slide member 268 during extension of the chassis slide member 268 as shown in FIGS. 14 and 17.

As shown in FIGS. 14 and 17, whenever the chassis slide member 268 is extended to position the center of mass of load 270 mostly over the movable ball bearing retainer 274, the downwardly directed forces 272 will cause elongated rail-like lower portions 290, 292 of chassis slide member 268 to engage the underlying skid pad 280 and transfer load 272 to skid pad 280. Because no clip containing ball bearings is provided at the outermost end 282 of stationary slide member 264, the ball bearing deformation problem is avoided. Instead, the skid pad 280 receives load 272. Although the skid pad 280 is a welcome improvement to horizontally mounted slide assemblies, it can also be used in vertically mounted slide assemblies.

Although the invention has been described in detail with reference to a certain preferred embodiment, variations and modifications exist within the scope and spirit of the invention as described and defined in the following claims.

We claim:

1. A telescoping slide apparatus for moving equipment between a retracted position and an extended position, the apparatus comprising a plurality of bottom-mounted telescoping slide assemblies, each slide assembly having a stationary slide member, a chassis slide member, and an intermediate slide member interconnecting the stationary and chassis slide members for movement between a fully retracted position and a fully extended position, and means for connecting the intermediate slide members together, the connecting means including aperture means for receiving the intermediate slide members and positioning the intermediate slide members in parallel spaced-apart relation.

2. The apparatus of claim 1, wherein the connecting means includes a plate member having a longitudinal axis and a plurality of channels extending parallel to a longitudinal axis of the slide assemblies.

3. The apparatus of claim 2, wherein the channels are formed to include the aperture means.

4. The apparatus of claim 2, further comprising means for providing lateral stability to the equipment when the equipment is in the retracted position, and wherein the connecting means further includes a pair of lateral edges extending along the length of the plate member and parallel to the longitudinal axis and a skirt depending from each lateral edge, and the providing means is coupled to the skirts.

5. The apparatus of claim 4, wherein the telescoping slide assemblies are configured to be mounted between a surface for supporting the equipment and a bottom surface of the equipment and the providing means includes a plurality of rollers rotatably coupled to each skirt, the rollers have an outer diameter equal to the distance between the supporting surface and the bottom surface of the equipment so as to provide lateral stability to the equipment when the equipment is in the retracted position.

6. The apparatus of claim 5, wherein the providing means further includes means for fastening the rollers to the skirts and the fastening means is configured to allow rotational, vertical, and horizontal movement of the rollers relative to the skirts.

7. The apparatus of claim 1, wherein the telescoping slide assemblies further include means for engaging ball bearings positioned between the chassis slide members and their respective intermediate slide members to hold the chassis slide members in the extended position relative to the intermediate slide members.

8. The apparatus of claim 7, wherein at least one of the chassis slide members includes an inner end portion deformed to define the engaging means and the engaging means includes flared tips formed to engage the ball bearings.

9. The apparatus of claim 8, wherein the ball bearings positioned between the chassis slide members and their respective intermediate slide members are laterally separated by a first distance and the flared tips are laterally separated by a second distance and the second distance is slightly greater than first distance.

10. The apparatus of claim 7, wherein the engaging means includes a pair of dimples formed in each intermediate slide member.

11. The apparatus of claim 10, further comprising a ball bearing retainer mounted for movement in each intermediate slide member and configured to contain said ball bearings and stop means appended to the intermediate slide member for stopping movement of the ball bearing retainer at a predetermined position during movement of the chassis slide member toward its fully extended position and wherein the stop means is situated in spaced-apart relation to said pair of dimples to define means for receiving one of said ball bearings between each dimple and said stop means to establish a friction lock-out mechanism.

12. The apparatus of claim 10, wherein at least one of the chassis slide members includes an inner end portion, the engaging means includes flared tips configured to engage the bearings, and the flared tips are coupled to the inner end portion.

13. The apparatus of claim 12, wherein the bearings are laterally separated by a first distance, the flared tips are laterally separated by a second distance, and the second distance is slightly greater than first distance.

14. A telescoping slide apparatus for moving equipment between a retracted position and an extended position, the apparatus comprising a plurality of bottom-mounted telescoping slide assemblies, each slide assembly having a stationary slide member, a chassis slide member, and an intermediate slide member interconnecting the stationary and chassis slide members for movement along a longitudinal axis between the fully retracted position and the fully extended position, and means for connecting the intermediate slide members together in parallel spaced-apart relation, the connecting means including a plate and means for strengthening the plate, the strengthening means including a plurality of channels in the plate extending parallel to the longitudinal axis of the slide assemblies, and means for providing lateral stability to the equipment in the retracted position so as to reduce transverse oscillations of the equipment relative to the cabinet.

15. The apparatus of claim 14, wherein the strengthening means further includes a pair of lateral edges extending parallel to the longitudinal axis and a skirt depending from each lateral edge, and the providing means is coupled to the skirts.

16. The apparatus of claim 15, wherein the strengthening means includes aperture means for receiving and positioning the intermediate slide members parallel to the longitudinal axis of the slide assemblies and the aperture means are formed in the channels.

17. The apparatus of claim 14, further including means for releasably maintaining the chassis slide members in an extended position relative to the connecting means, the maintaining means including a pair of facing bearing races.

18. The apparatus of claim 17, wherein each chassis slide member and each intermediate slide member include a pair of lateral edges, each lateral edge is formed to include a bearing race so that a bearing race formed in a chassis slide member faces a bearing race formed in its respective intermediate slide member to form one of the pair of facing bearing race, each chassis slide member includes an inner end portion, and the inner end portions have deformations for engaging a bearing positioned between the facing bearing races.

19. The apparatus of claim 18, wherein each deformation includes a flared tip that extends laterally at an acute angle to the longitudinal axis of the slide assemblies toward one of the pair of facing bearing races and projects into a plane defined by the bearing race formed on the chassis slide member.

20. A telescoping slide apparatus for moving equipment between a retracted position and an extended position, the apparatus comprising a plurality of bottom-mounted telescoping slide assemblies, each slide assembly having a stationary slide member, a chassis slide member, and an intermediate slide member interconnecting the stationary and chassis slide members for movement along a longitudinal axis between the fully retracted position and the fully extended position, bearings positioned between the chassis slide members and their respective intermediate slide members, and means for engaging bearings to hold the chassis slide members in the extended position relative to the intermediate slide members, the engaging means being coupled to the chassis slide members.

21. A telescoping slide apparatus for moving equipment between a retracted position and an extended position, the apparatus comprising a plurality of bottom-mounted telescoping slide assemblies, each slide assembly having a stationary slide member, a chassis slide member, and an intermediate slide member interconnecting the stationary and chassis slide members for movement between a fully retracted position and a fully extended position, and means for connecting the intermediate slide members together, the connecting means including a longitudinal axis and a plurality of longitudinally extending channels.

22. The apparatus of claim 21, wherein the longitudinally extending channels are formed to include aperture means for receiving the intermediate slide members and positioning the intermediate slide members parallel to the longitudinal axis of the slide assemblies in spaced-apart relation to each other.

23. The apparatus of claim 22, wherein the connecting means further includes a plate member having a pair of longitudinally extending lateral edges and a skirt depending from each edge and means for providing lateral stability to the equipment and the providing means is coupled to the skirts.

* * * * *